C. E. SORENSEN.
ART OF PRODUCING BALL BEARING STRUCTURES.
APPLICATION FILED MAR. 15, 1920.
1,395,607.
Patented Nov. 1, 1921.
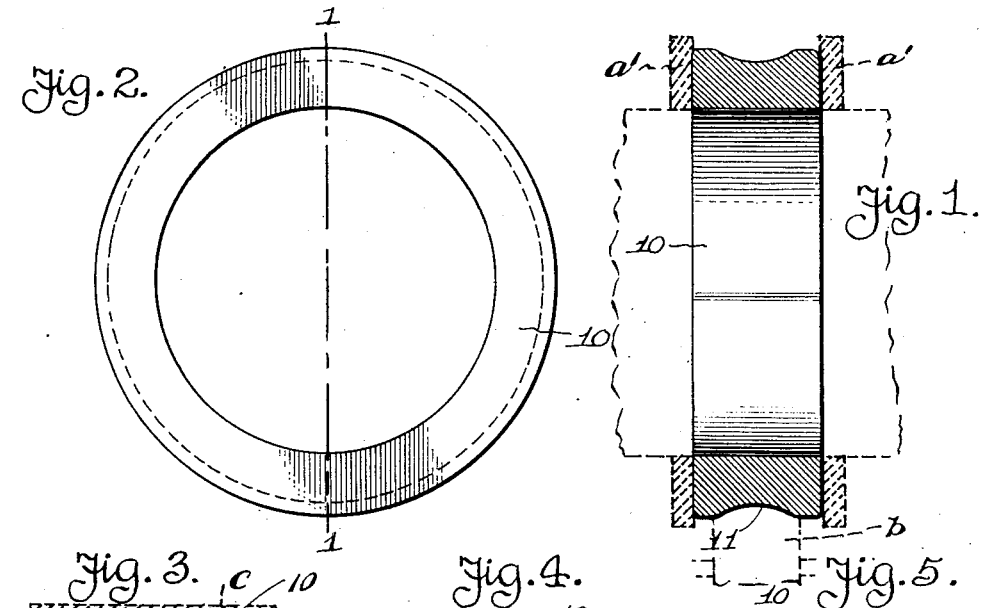
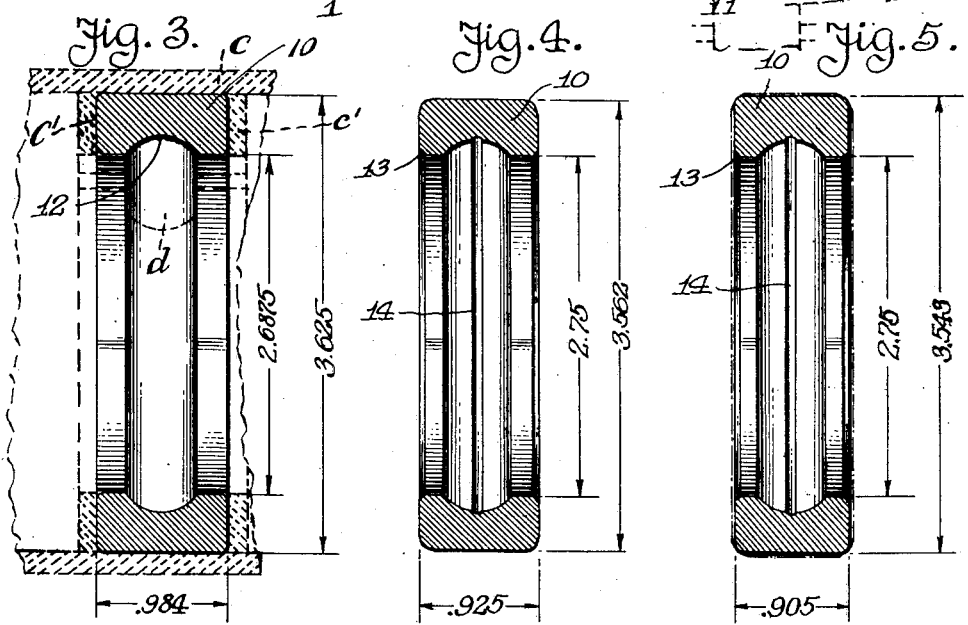
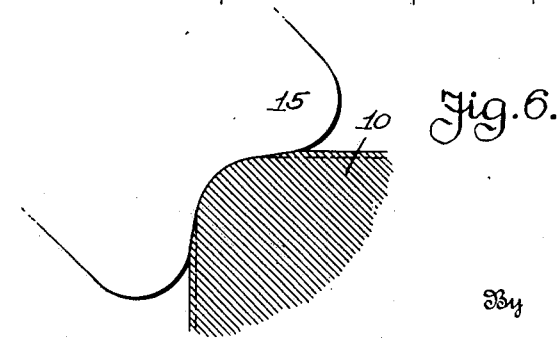
Inventor
Charles E. Sorensen
By
Attorneys

UNITED STATES PATENT OFFICE.

CHARLES E. SORENSEN, OF DEARBORN, MICHIGAN, ASSIGNOR TO HENRY FORD & SON, INC., OF DETROIT, MICHIGAN, A CORPORATION OF MICHIGAN.

ART OF PRODUCING BALL-BEARING STRUCTURES.

1,395,607.   Specification of Letters Patent.   Patented Nov. 1, 1921.

Application filed March 15, 1920. Serial No. 366,054.

*To all whom it may concern:*

Be it known that I, CHARLES E. SORENSEN, a citizen of the United States of America, residing at Dearborn, in the county of Wayne and State of Michigan, have invented certain new and useful Improvements in the Art of Producing Ball-Bearing Structures, of which the following is a specification, reference being had therein to the accompanying drawings.

This invention relates to improvements in the art of producing ball bearing structures, pertaining more particularly to the race members of such structures, and the method of producing the same.

Ball bearing structures, especially of the type adapted for radial loads, generally consist of the inner and outer members and the interposed ball members, the latter in many cases, including a cage structure. The race members have been of various types differing mainly in the provisions for introducing the balls, the members, however, being formed with annular grooves opposing each other and within which the balls are mounted, the bottoms of the grooves providing the particular face with which the ball contacts under normal operation, the shifting of the contact to positions laterally of such bottoms being generally due to temporary thrust action exerted in the direction of the axis of the bearing.

Various methods have been employed in the production of the race members with a view to the production of members capable of sustaining the integrity of the bearing and producing long life conditions of the bearing. These methods vary according to the specific uses to which the bearing is to be put, those race members which are employed in connection with bearings adapted for use under conditions where the service is not hard or difficult, generally differing from those where heavy duty service conditions are present. As a result, the latter type of bearing requires a special treatment in connection with the race members the result being that the cost is comparatively high, due to the accuracy with which the race members are required to be produced as compared to a standard race member. Many of these methods are secret, the result being that the cost of the bearing to the user is dependent entirely upon the price which the manufacturer may see fit to ask.

The present invention is designed to meet the problems of race member production in such manner as to provide for the production of a race member of the highest quality and at the same time at a comparatively low cost; in addition, the method of production is such as to give charactertistics to the race member itself such as are not produced by the usual methods employed, characteristics which provide for superior operating action of the bearing itself.

While both the inner and outer race members may be produced by the method herein disclosed, particular advantage is had in the cost of production in connection with the manufacture of the outer race member, due to the fact that this latter member carries the ball groove internal of the member, a position more or less difficult to reach for accurate operation. On the contrary, the ball groove of the inner member is an external groove, permitting freer action in the production of the groove. Where it is desirable only to provide for the decreased cost of manufacture, and where the service conditions are such that the inner race member characteristics when produced by simple methods is sufficient to meet the service conditions, it is preferred only to utilize the method in connection with the outer race member. Where, however, the bearing is of extra heavy duty service character, both members may be produced by the methods, thus obtaining the advantage of the changing characteristics of the members themselves produced by the present method, thus producing a bearing of a higher and superior quality.

To these and other ends, therefore, the nature of which will be readily understood, as the invention is hereinafter disclosed, said invention consists in the improved construction of race member and the methods of producing the same, as hereinafter more fully described, illustrated in the accompanying drawings and more particularly pointed out in the appended claims.

In the accompanying drawings, in which similar reference characters represent similar parts, Figure 1 is a sectional view taken on the line 1—1 of Fig. 2;

Fig. 2 is a side elevation of a blank adapted to produce an outer race member, the blank of Figs. 1 and 2 being shown as in the condition at the close of the first manipulating step on the blank;

Fig. 3 is a sectional view of the blank of Fig. 1 at a succeeding stage of the operation:

Figs. 4 and 5 illustrating succeeding stages in the production of the member;

Fig. 6 is a detail diagrammatic view illustrating one of the finishing steps.

For the purpose of explaining the general principles of the invention, I have shown it as applied to the production of the outer race member, and before describing the general operation in detail, I will briefly describe the general method and point out some of the effects and results obtained in connection with the several steps.

The race member is formed from an annular blank of suitable metal, as for instance, high carbon chrome steel. The axial length of the blank is slightly greater than that of the completed member and the inner diameter of the blank is less and the outer diameter greater than that of the completed member. For instance, the blank which is adapted to produce the member of Fig. 5 having the dimensions indicated in said figure, has the initial axial length of substantially one inch, this being maximum with an allowance of 1-64 inch decrease; the outer diameter of the blank may range from 3.640 inches to 3.625 inches while the inner diameter may range from 2.7031 inches to 2.6875 inches, the different allowances being possible variations permissible in the production of the member.

After heating, the blank is subjected to what may be termed an upsetting operation, this operation consisting in producing an annular groove on the outer face of the blank by a pressure action of suitable type, the blank being mounted on a suitable mandrel corresponding to the inner diameter of the blank, the sides of the blank, if it is desired and this is preferred, being supported by suitable supports which operate to prevent the pressure application from lengthening the blank in the direction of its axis. The pressure action or application may be provided by any suitable means, as for instance, by the use of a roller or other form of apparatus adapted to provide pressure toward the center of the blank. The groove is preferably of greater width than the ball groove of the completed member and is of less depth than such groove. For instance, the groove of the blank of Fig. 1 has its face extending on a radius of 9-16 inch with the depth of the groove ranging from .09 inch to .0875 inch.

As a result of this operation, the metal of the central portion of the width of the blank is more or less compacted, tending to vary the texture to some extent. with the greatest effort and effect necessarily produced at the bottom of the groove formed, it being understood, of course, that with the groove produced on the arc of a circle, that the depth of the groove will vary from the center toward the point where the ends of the curve intersect the outer face of the blank on a cross section of the blank. It is to be understood, of course, that this external groove has its bottom opposite the portion of the bottom of the ball groove which is to be formed; that is, the bottom of this internal groove lies midway of the width of the blank, corresponding in this respect, with the position of bottom of the ball groove in the width of a completed article, the latter, however, not presenting the evidences of this external groove, the latter being removed during subsequent treatment of the blank.

As will be readily understood, this rolling or forging action in producing the external groove while the blank is at comparatively high temperature has the effect of producing a finer grain to the metal with a tendency to a variation due to the fact that the pressure or mechanical treatment of the metal produced by the rolling and forging action varies by reason of the curvature of the groove, the greatest pressure being applied at the bottom of the groove due to the greater depth of the groove in this particular zone represented by the slight variations of different parts of the groove face from a line of the outer face and which would extend parallel to the inner face of the blank. Consequently, there is the beginning of a change in texture of the metal tending to produce a variation in density of the metal from the center of the blank toward the opposite sides, the side portions having somewhat the characteristics of the initial blank metal, since the pressure is applied radially, and such change as may take place at the sides of the blank being produced only by the possible presence of a slight flow of metal toward said side portions. This variation of density is made apparent by reason of the fact that the groove does not reach the sides of the blank, the point of intersection of the curved line of the groove and of the outer face being spaced some distance from the sides of the blank.

This initial step of producing the external groove by rolling or a forging action, not only has an effect in changing the molecular structure of the blank, but acts to materially shorten and decrease the cost of the production of the completed article. This is due to the fact that the production of the external groove provides an external space opposite the point where the internal ball groove is to be produced. Consequently when the next step is provided, this step consisting in rolling an internal groove with the blank supported externally but with no support within the initial groove, the metal of this compacted portion of the blank may be displaced outwardly to carry it into the space provided by this initial groove. Obviously, the pressure required in producing this displacing action need not be as great as that which would be required if an attempt were made to roll the internal groove with the outer face of the blank extending in a plane surface and with the groove omitted. If the latter were attempted it would be a difficult matter to apply sufficient pressure owing to the fact that the face being operated upon is an internal face so that the space within which the apparatus for applying the pressure could be put is relatively small, and practically inadequate to permit the use of proper apparatus to obtain the high pressures which would be required. On the contrary, since the metal is being displaced to a material extent, the pressure required is not so great, so that it is possible to produce this internal groove by rolling action rather than by the slow processes of turning or grinding the groove.

While there is a displacing action—the succession of operations described is such as to permit the second operation to be obtained by the use of less pressure—the different form of the inner groove from that of the outer groove also has an effect on the density characteristic of the metal due to the fact that the groove is of less width and of greater depth than that of the outer groove so that there is produced an additional compacting action through the fact that the thickness of the blank of greatest depth of the groove is less than the thickness produced by the formation of the initial outer groove, so that the metal is compacted to the extent provided by this difference in thickness; the amount of this compacting is, however, comparatively small as compared with what would be required if an attempt were made to omit the initial outer groove forming step, this additional compacting action being capable of being produced within the small space limitations provided by the blank itself, it being possible to employ apparatus capable of producing sufficient pressure for the purpose under the conditions in race members of a reasonable size.

In the example shown the inner groove of Fig. 3 has the radius of .321, the depth of the groove being approximately .1622. By comparing the depth of the inner groove and that of the outer groove, as above indicated, it will be understood that rolling the inner groove under the second operation, has served to decrease the thickness on the line of pressure of the bearing—approximately .07 inch, thus compacting the metal additional to that produced in the formation of the outer groove and at the same time serving to provide the displacing action of metal which is produced by the shifting of metal in filling the space provided during the first operation. As a result, the action in practically working the metal at this point relative to the side portions of the race member has materially affected the texture characteristics of the metal itself it having been found in practice, as demonstrated by micro-photographs, that there is a radical change in the characteristics of the metal from that of the original blank, this change being most pronounced in the photographs of the blank at the close of the second operation, in which the grain of the metal and the density has been materially varied even from the results produced by the first operation, the greatest density being within the zone of the line of pressure application under load conditions, this density characteristic varying in opposite directions toward the sides of the race member, the latter being of less density than the portions within the zone.

This difference in density characteristic, is of course, of material value in the completed member, since the member is thus made up of an integral structure having distinct characteristics. For instance, at the point where the direct pressure application is applied in use, the metal is of the greatest density, while at that portion where there is no direct load application—at the sides of the member, the metal is of less density, thus giving the advantage of an integral structure which carries variations in density and texture such as provide for greater serviceability of the member itself.

This second operation is preferably performed, in immediate succession to that of the first operation, a single heating of the blank serving to permit of both operations being completed. Obviously, this provides for a greatly simplified method of manufacture and at the same time greatly reduces the cost of production of the embryo member, it being understood, of course, that at the close of the second operation, the member has the general characteristics of the completed member with the exception of those produced by the heat treatment and by the turning and grinding operations in completing the member.

The embryo member is then subjected to a heat treatment designed to give the blank the desired characteristics as to hardness, etc., the character of treatment employed being that which is suitable for the metal used in the formation of the initial blank. And in providing this treatment, the variations in density conditions provided by the first and second operations may be of importance through the fact that while the intermediate portion of the member is of less thickness as compared with the portions at the sides of the member, due to the presence of the groove, the density of this portion of less thickness is materially greater than that at the sides so that there is presented the condition of variations in density in general correspondence to the variations in thickness, so that there is produced a more desirable finished product resulting from the heat treatment operation on the member as compared to the product which results from attempting to utilize the heat treatment in the formation of bearings in which the texture and density remains uniform throughout the metal of the member.

After the heat treatment has been provided, the embryo member is finished by turning the groove to its approximate size, followed by a grinding operation to the true size, and the completion by producing the desired external configuration to the member.

In the turning operation, it will be understood that since the groove has been practically shaped and positioned, through the earlier operations, the turning operation becomes rather simple through the fact that there is a requirement only of a removal of a small portion of the metal instead of removing the entire portion which forms the groove, as in the general method of manufacture of race members.

In the drawings, 10 denotes the race member which in its blank form is simply an annular ring of the desired material, the dimensions being varied from the completed member dimensions to permit of the removal of metal in the finishing of the member.

In Fig. 1, 11 indicates the external groove provided by the first operation, this groove, as heretofore pointed out, having a greater width and less depth than the internal groove of the product resulting from the second operation or of its finished form. Fig. 3 shows the product resulting from the second operation, the internal groove 12 having been produced and the external groove 11 practically eliminated by the pressure employed in the second operation.

The product shown in Fig. 3, is then subjected to heat treatment, after which follows the various operations. For instance, in Fig. 4, groove 12 is shown as having received the turning operation, and as having been provided with the chamfer 13 and, if desired, the bottom of the groove may have been given an annular groove formation, indicated at 14, this groove being employed in some cases, although not essential in all cases. It has the advantage of permitting the succeeding grinding operation to be performed by a different method than is generally employed, since it is possible to provide for grinding of the groove 12 on each side of groove 14 individually, groove 14 providing a space which will permit the edge of the grinding tool to overlap without affecting the bearing surface, enabling a better product to be obtained from the grinding operation, especially where the curvature of the groove in cross section is of a special type. This particular form, however, is not claimed specifically in the present application, and is therefore not described in detail, a race member carrying a groove of this character being disclosed in a companion application.

The product of Fig. 4, is also shown as having been subjected to the grinding action shown in Fig. 6, in which the outer corners have been rounded off by the use of a suitable grinding tool 15, this facilitating the final grinding operation since it becomes necessary only to remove the exterior face and the side faces to the extent shown in Fig. 5, in which the dotted outline indicates the formation at the end of this grinding operation shown in Fig. 6, the full line representation indicating the finished product in this respect. Fig. 5 also shows the final grinding operation of groove 12, the product of Fig. 5 then being subjected to the usual finishing operations, such as burnishing, etc.

The apparatus employed will, of course, be of a type which will produce the results pointed out herein. In Figs. 1 and 3 I have shown in dotted lines some of the characteristics of the structure employed. For instance, in Fig. 1, $a$ indicates a mandrel on which the blank is located, $a'$ indicating side supporting members which are suitably held to maintain the blank against increasing in width under the pressure application of roll $b$, the latter operating on the external face of the blank. Since the action on the blank in Fig. 3 is internal, a ring $c$ is employed in place of the mandrel $a$, the side supporting members $c'$ serving to prevent width-increasing action; the pressure roll is indicated $b$.

From the above it will be readily understood that not only is there produced a race member having materially different characteristics from those heretofore provided by the prior commercial operations, but in addition, the methods of manufacture are so changed as to permit of the production of the member at a greatly decreased cost, making it possible to produce a race member of superior quality at a lower cost than that of the commercial product of the present time.

In the drawings, I have indicated some of the dimensions of one form in which the race member has been produced by the methods herein disclosed, it being readily understood that these dimensions are subject to variations as may be found desirable or essential, it being clear that where a different sized member is to be produced, the dimensions will be necessarily changed.

No specific heat treatment is specified, for the reason that the particular kind of treatment employed will depend more or less upon the particular character of the metal employed in producing the member, one feature of the treatment being the fact that it is possible to practically determine the character of treatment by using as a basis of comparison, for instance, the treatment required by the thinner portion of the metal, the varying density tending to compensate for the variation in thickness of the metal at the bottom of the groove and at the sides of the member; or the sides may be used for this basis of comparison, this being determined by the character of the metal and of the character of the treatment which is being employed.

The operations are of a greatly simplified character and so provided as to permit of the use of apparatus capable of operating upon the blank efficiently and expeditiously. In addition, the change in density characteristic produced by forging or rolling the metal in opposite directions produces a structure of metal throughout a cross section of the member such as to be especially serviceable under the severe conditions which a race member of this type is subjected to.

While I have herein shown and described one embodiment of the present invention, it will be readily understood that changes and modifications in the methods may be found desirable or essential in meeting the conditions of service, especially the conditions where it is desirable to provide for finished race members of comparatively widely different characteristics. For instance, the depth and width of the groove 11 may be varied so as to provide for a different density condition at the bottom of the groove, even though the latter may be designed to be of the same dimension as that shown, it being readily understood, of course that upon the dimensions of the outer groove 11 will depend somewhat, the character of the density of the metal at the inner groove, it being understood that if the depth of the groove 11 decrease, a greater amount of pressure will be required in producing the internal groove, the result being that the intervening metal will be compacted to a greater extent; similarly, if the depth of groove 11 is increased, the amount of pressure required in completing the internal groove by the rolling action would be decreased. But in each case, it will be obvious that sufficient pressure would be required to displace the intervening metal so as to substantially close the groove 11 previously prepared.

I desire it to be understood, therefore, that I reserve the right to make any and all changes or modifications in the methods employed, as may be found desirable or essential in the production of the desired product, in so far as the same may fall within the spirit and scope of the invention as expressed in the appended claims, when broadly construed.

What I claim is:—

1. The method of producing ball race members which consists in subjecting the member blank to pressure application intermediate the sides of the blank to vary the density of the blank cross-sectionally and produce an embryo race member having an approximate race groove face and with the portion of greater density corresponding approximately with the bottom of the groove, and then completing the groove by a removal of groove face material.

2. The method of producing ball race members wherein the race groove is symmetrically positioned between the sides of the member, said method consisting in subjecting the member blank to pressure application varied in approximate correspondence to the curvature of the groove face cross-section to produce variations in density of the member on a cross-section thereof and produce an embryo race member having an approximate race groove face, and with the portion of greatest density corresponding approximately with the bottom of the groove, and then completing the groove by a removal of groove face material.

3. The method of producing an embryo ball race member which consists in subjecting a circular face of the blank to pressure application to produce an annular groove therein, and then subjecting the opposite circular face to a pressure application to displace member material in the direction of the first groove to produce an approximate ball race groove and substantially eliminate the first groove.

4. The method of producing an embryo ball race member which consists in applying pressure to the blank in a direction toward the face of the member which receives the ball groove of the completed member to produce an annular groove on the member face opposite the ball groove face of the member and then subjecting the blank to pressure applied in the opposite direction to displace blank material toward the first groove to produce the approximate ball race groove and substantially eliminate the first groove.

5. The method of producing an embryo ball race member which consists in producing a temporary annular groove on that face of the blank opposite the face which is to carry the ball race groove, and of greater width cross-sectionally than the ball race groove, and then substantially eliminating the temporary groove by the formation of the approximate ball race groove, both grooves being produced by pressure application.

6. The method of producing an embryo ball race member which consists in producing a temporary annular groove on that face of the blank opposite the face which is to carry the ball race groove, and of less depth cross-sectionally than the ball race groove, and then substantially eliminating the temporary groove by the formation of the approximate ball race groove, both grooves being produced by pressure application.

7. The method of producing an embryo ball race member which consists in producing a temporary annular groove on that face of the blank opposite the face which is to carry the ball race groove, by pressure application with the groove of greater width and less depth than the ball race groove and then substantially eliminating the temporary groove by the formation of the ball race groove by displacing member metal under pressure application.

8. The method of producing an embryo ball race member which consists in heating the blank and subjecting the heated blank to pressure applied first in one direction and then in the opposite direction with the pressure applied intermediate the sides of the blank, each application being effective to produce an annular groove and with the second pressure application effective to substantially eliminate the groove of the first application.

9. The method of producing an embryo outer race member for ball bearings, which consists in subjecting the member blank to pressure applied radially upon the external face of the blank to produce an external groove on the member, and then applying pressure in the opposite direction on the internal face of the blank to concurrently produce the approximate ball race groove and substantially eliminate the external groove.

10. The method of producing an embryo outer race member for ball bearings, which consists in subjecting the member blank to pressure applied radially upon the external face of the blank, while supporting the internal face to concurrently produce a groove in the external face and compact the metal on the line of the bottom of the ball race groove of the completed member, and in the presence of an external support ineffective on that portion of the external face within the external groove of the member, to pressure applied in the opposite direction to concurrently produce the approximate ball race groove and displace member metal into the external groove zone to substantially eliminate the latter.

11. The method of producing an embryo outer race member for ball bearings, which consists in subjecting the member blank to pressure applied radially upon the external face of the blank, while supporting the internal face to concurrently produce an external groove in the external face and compact the metal on the line of the bottom of the ball race groove, of completed member, and, in the presence of an external support ineffective on that portion of the external face within the external groove of the member to pressure applied in the opposite direction to concurrently produce the approximate ball race groove and displace member metal into the external groove zone to substantially eliminate the latter, the relative dimensions of the grooves being such that the second pressure application is effective to produce an increased compacting of the member metal on such line.

12. In the production of ball race members wherein the overall dimensions of the member blank cross-sectionally are such as to differ from the similar dimensions of the completed blank with the difference requiring removal of metal on each of the blank faces, the method of completing the true cross-sectional dimensions which consists in producing an embryo race member formation including the ball race groove and with the line of junction of the groove face and the sides of the blank chamfered, then removing the metal at the line of junction of such sides and the opposite face to produce a rounded configuration leading to the sides and face with a portion of such configuration located on the true dimension lines of the member, and then removing metal from the faces between the chamfers and such true dimension configuration and between the opposite configurations to present the several faces as tangents to the true-dimension portion of the rounded configurations.

13. A ball race member for ball bearings having an annular race groove, said member having its cross-section of different density characteristic with the portion of greater density positioned to locate it in correspondence with the direction of normal load application in the bearing assembly.

14. A ball race member of the type of claim 13, characterized in that the variations in density extend toward the opposite sides of the member.

15. A ball race member of the type of claim 13, characterized in that the variations in density extend toward the opposite sides of the member, and with variations provided within that portion of the member lying between parallel planes corresponding to the points of intersection of the wall of the race groove and the face on which the groove is formed.

In testimony whereof I affix my signature in the presence of two witnesses.

CHARLES E. SORENSEN.

Witnesses:
ERNEST KANZLER,
J. EMMET HALL.